May 3, 1955
C. F. HAMMOND
2,707,375
MANUAL AND POWER ACTUATED STEERING GEAR
Filed July 2, 1951
9 Sheets-Sheet 1
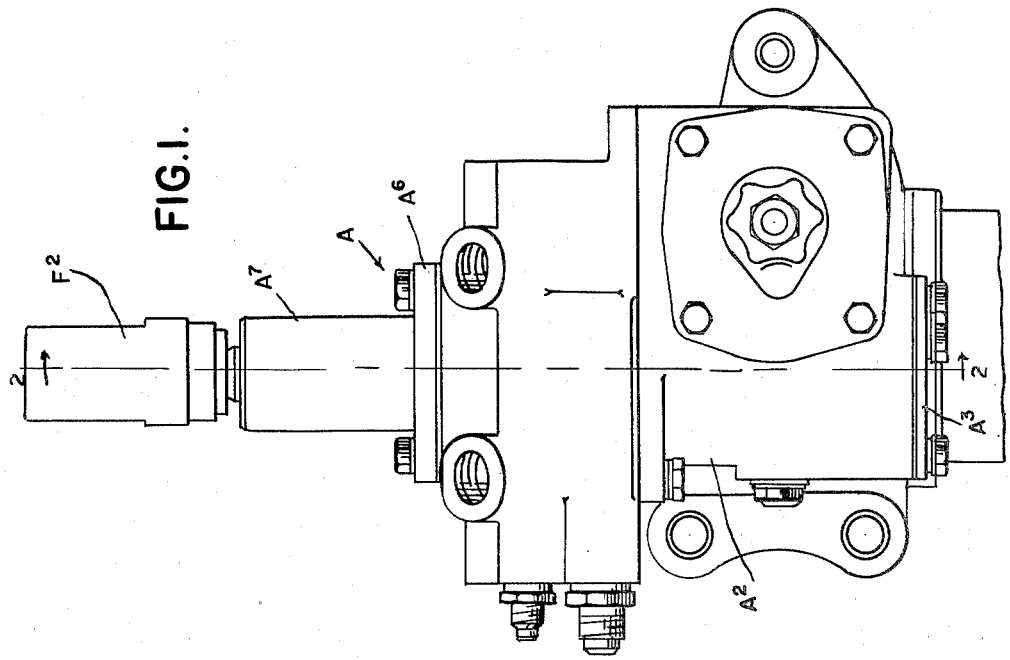
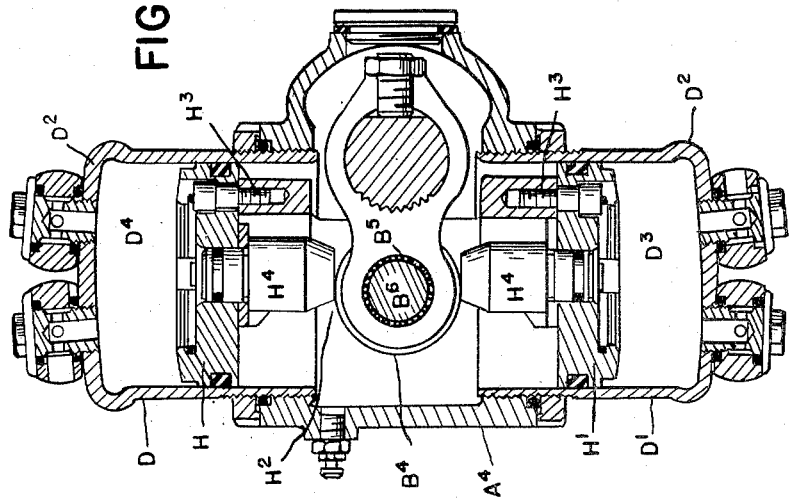
*INVENTOR.*
CHARLES F. HAMMOND
BY
Whittemore Hulbert & Belknap
ATTORNEYS May 3, 1955  C. F. HAMMOND  2,707,375
MANUAL AND POWER ACTUATED STEERING GEAR
Filed July 2, 1951  9 Sheets-Sheet 2
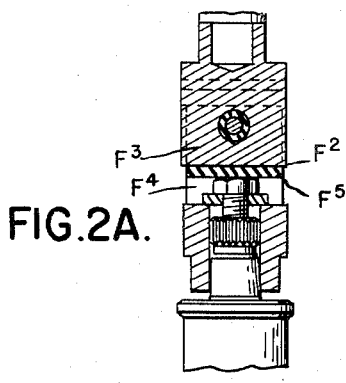
FIG.2A.
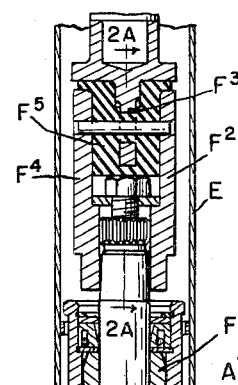
FIG.2.
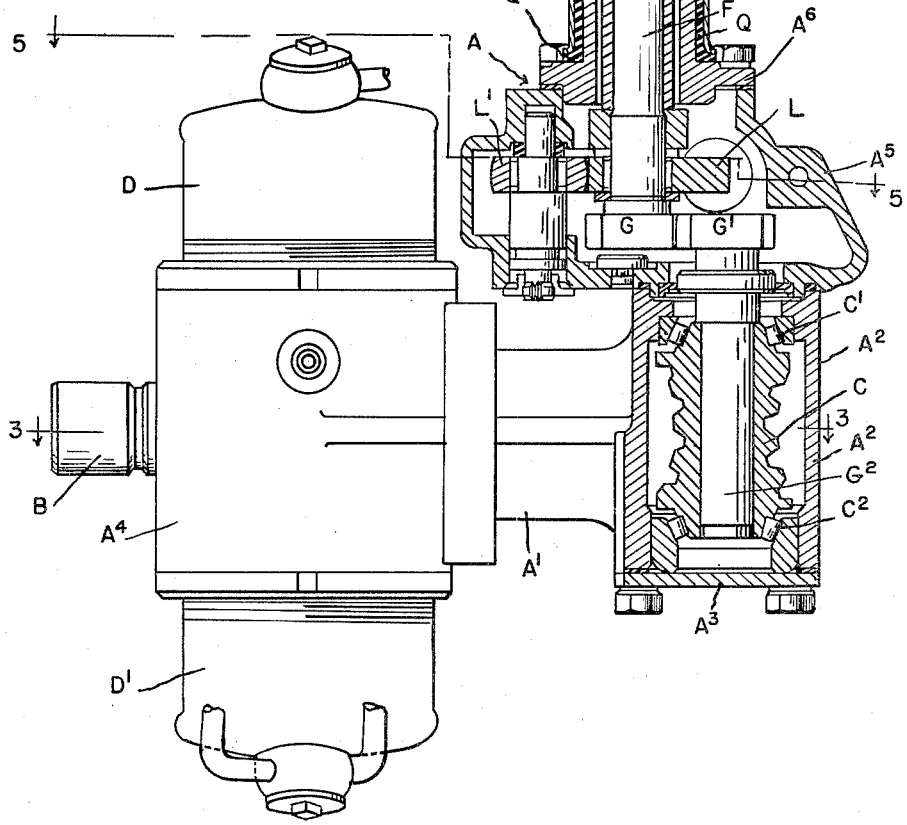
INVENTOR.
CHARLES F. HAMMOND
BY
Whittemore Hulbert Belknap
ATTORNEYS May 3, 1955

C. F. HAMMOND 2,707,375

MANUAL AND POWER ACTUATED STEERING GEAR

Filed July 2, 1951

INVENTOR.
CHARLES F. HAMMOND
BY
Whittemore Hulbert & Belknap
ATTORNEYS

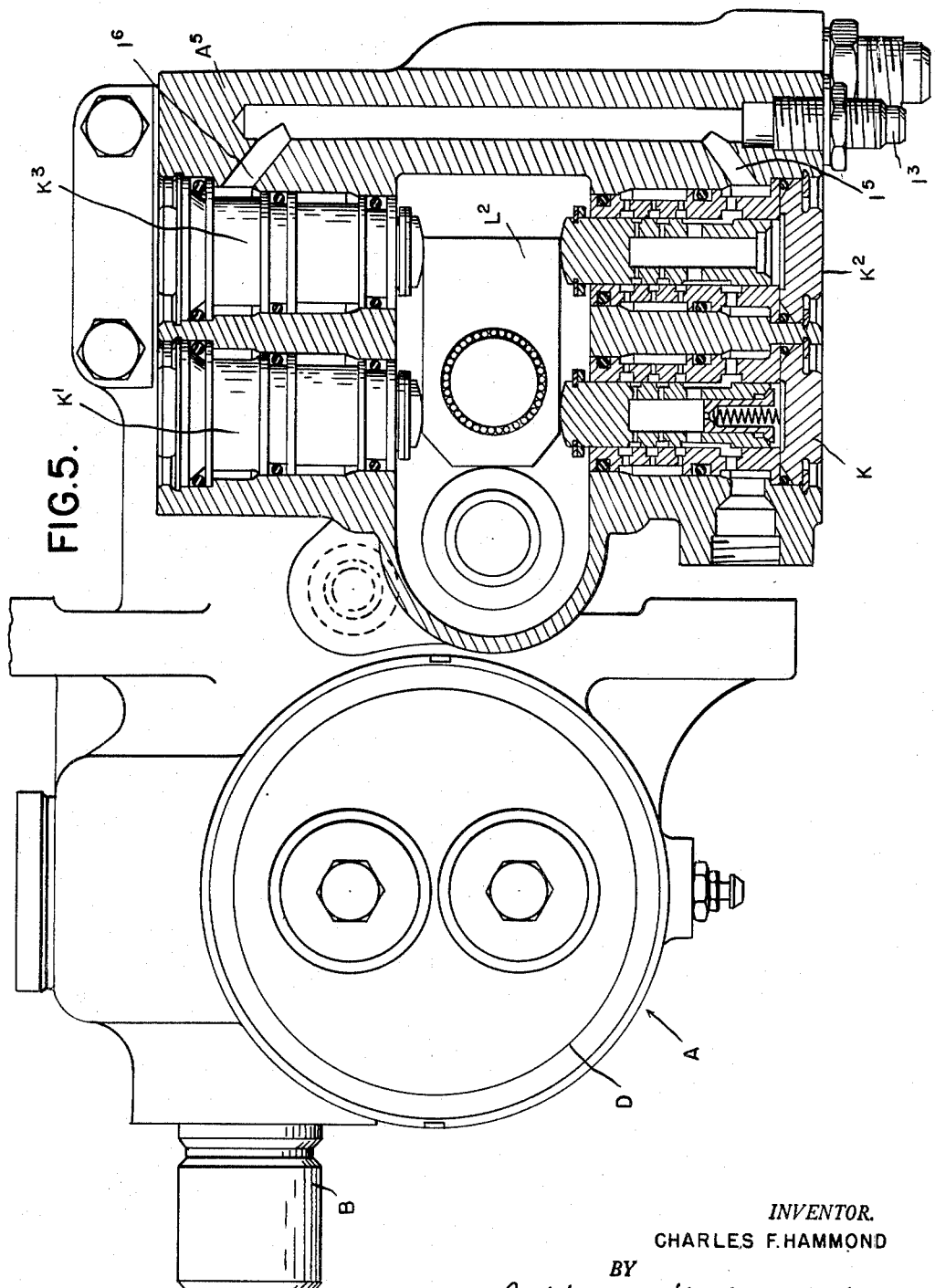

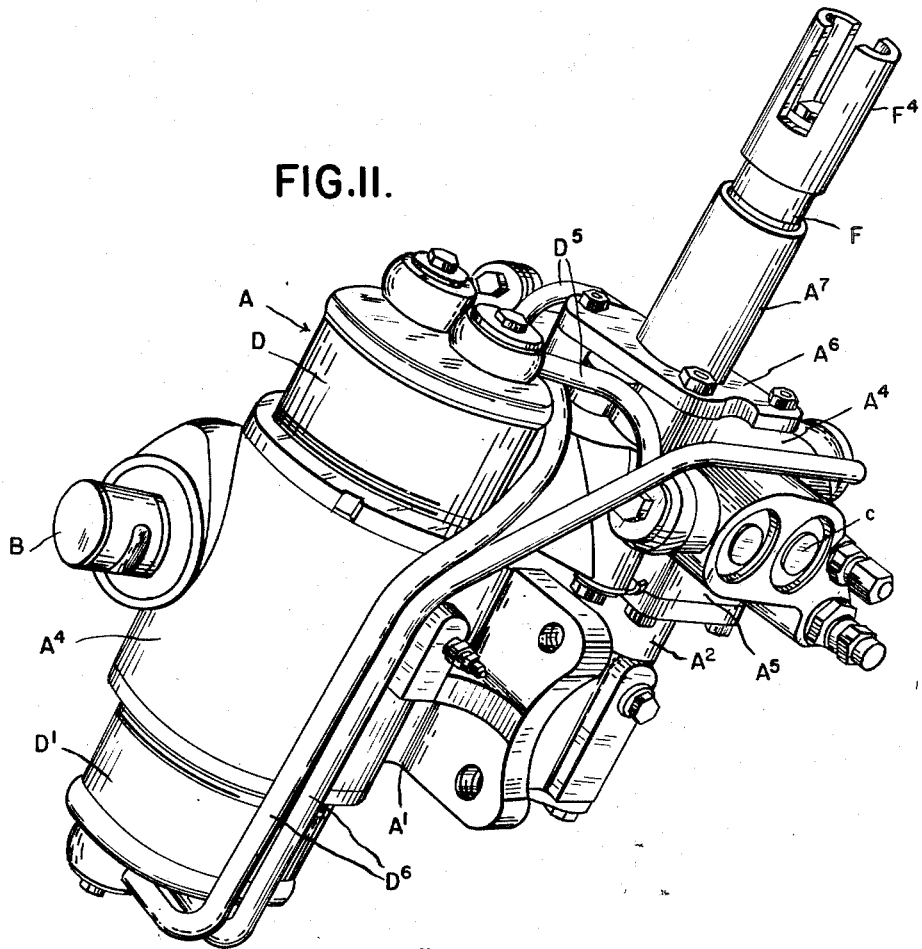
FIG.II.
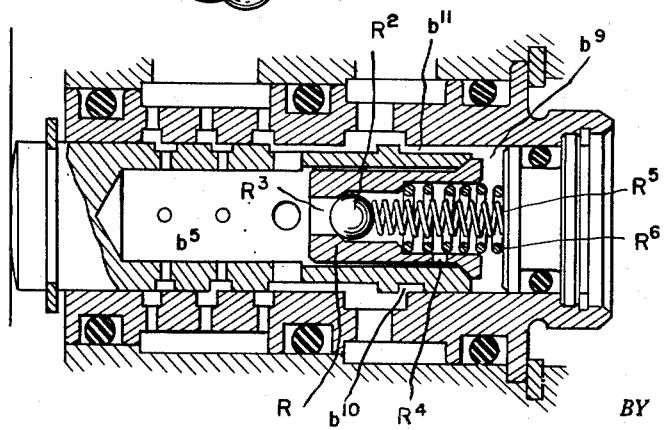
FIG.6B.

May 3, 1955

C. F. HAMMOND 2,707,375

MANUAL AND POWER ACTUATED STEERING GEAR

Filed July 2, 1951

INVENTOR.
CHARLES F. HAMMOND
BY
Whittemore Hulbert & Belknap

ATTORNEYS

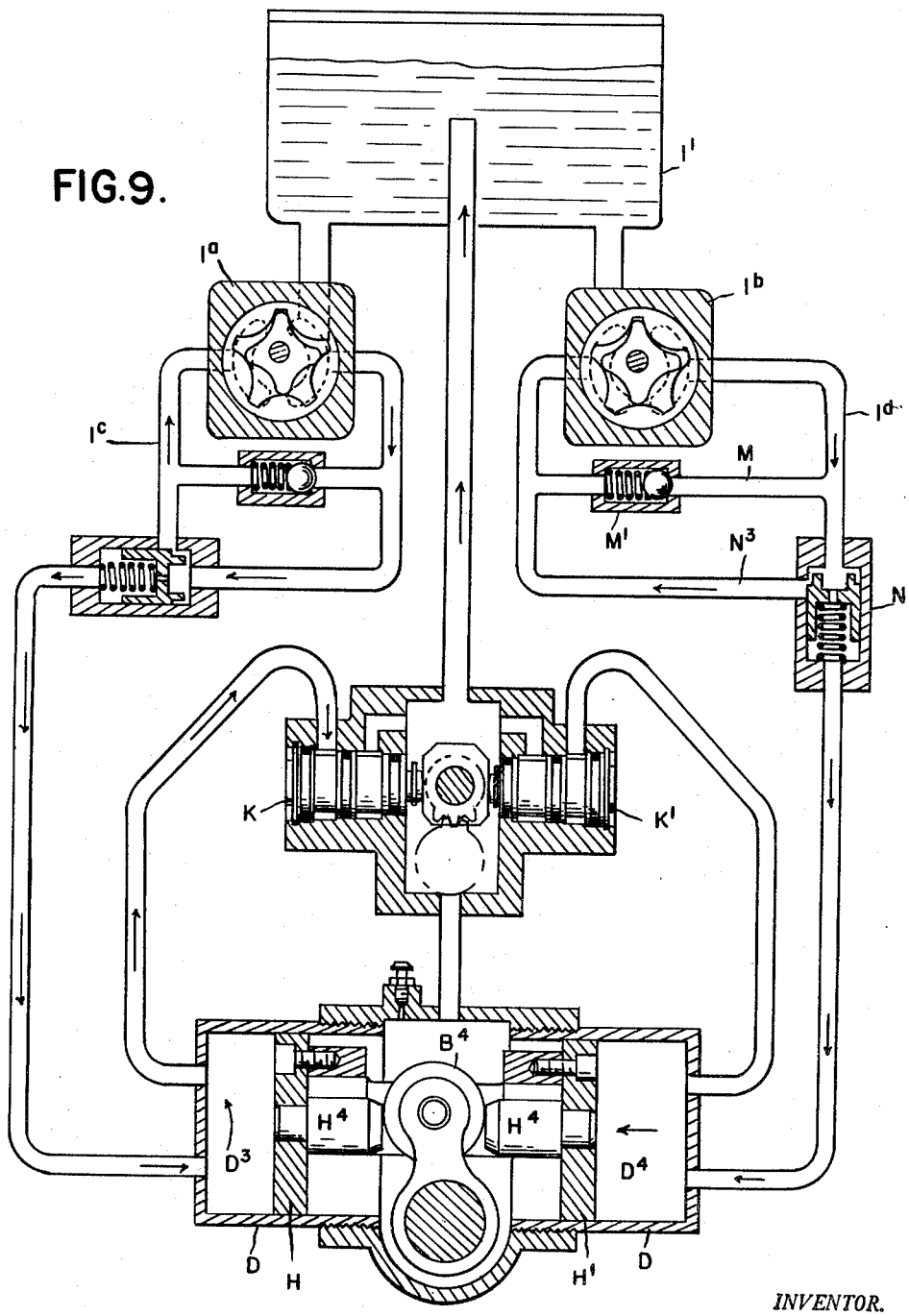

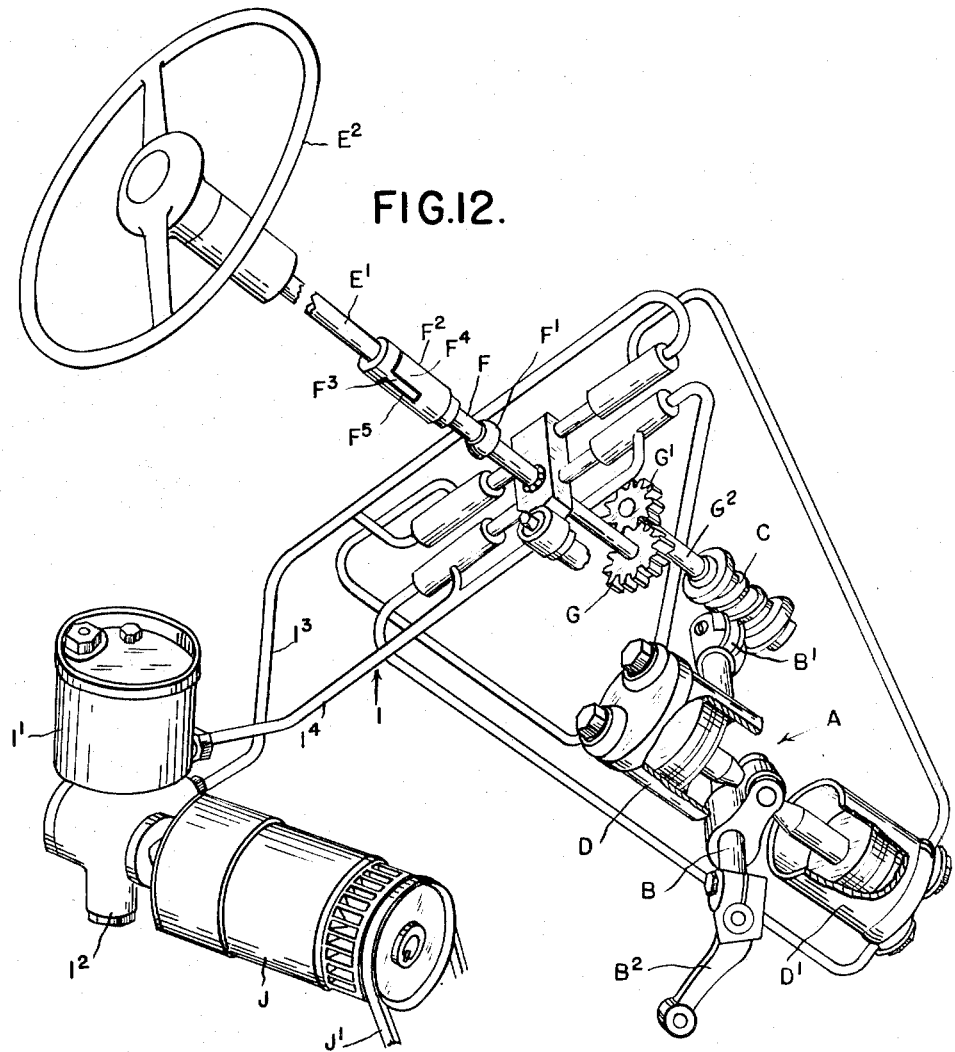

United States Patent Office 2,707,375
Patented May 3, 1955

2,707,375
MANUAL AND POWER ACTUATED STEERING GEAR

Charles F. Hammond, Grosse Pointe, Mich., assignor to Gemmer Manufacturing Company, Detroit, Mich., a corporation of Michigan Application July 2, 1951, Serial No. 234,795

14 Claims. (Cl. 60—52)

The invention relates to power actuated steering gears for motor vehicles and forms a continuation-in-part of my co-pending application for patent Serial No. 90,858, filed May 2, 1949, now Patent No. 2,650,669, issued September 1, 1953. In the construction of this former application, the steering mechanism is power actuated by a hydraulic motor, which in turn derives its power from a hydraulic fluid power circuit propelled by the motor of the vehicle whenever the latter is in operation. The motor is controlled by the manually operable steering wheel, and the construction is such that any, generally major, portion of the steering load is carried by the motor, while at the same time the power for carrying the balance of the load is supplied by the operator. Thus the operator feels the load while steering.

In the operation of an intermittently actuated hydraulic motor in combination with manually supplied force, such as in servo-mechanisms, it is difficult to obtain a smooth flow of power. In my former application this difficulty was partially overcome by connecting the motor to a hydraulic power circuit in which there was a continuous flow of fluid. However, the fluid (normally static) in the connections between this circuit and the motor has its own inertial reaction whenever the motor is energized.

It is one of the objects of the invention to avoid this defect and to obtain a smoother flow of power during the steering operation.

It is a further object to obtain a construction which minimizes any tendency to periodic oscillations within the hydraulic system.

A further object is to eliminate noise due either to the hydraulic system or to the mechanism.

It is a further object to obtain a construction of power unit applicable to the steering mechanism of an automobile or other motor vehicle with a minimum of change in the associated parts.

With these and other advantageous features in view, the invention consists in the construction as hereinafter set forth.

In the drawings:

Fig. 1 is an elevation illustrating my improved power actuating unit for a motor vehicle steering mechanism;

Fig. 2 is a section on line 2—2, Fig. 1;

Fig. 2A is a section on line 2A—2A, Fig. 2;

Fig. 4 is a section on line 4—4, Fig. 3;

Fig. 5 is a horizontal section substantially on line 5—5, Fig. 2, illustrating the valves and the operating mechanism therefor;

Fig. 6B is a modified construction of valve;

Fig. 9 is a similar diagram of still another modification;

Fig. 11 is a perspective view of the unit;

Fig. 12 is a diagrammatic perspective view illustrating the entire steering mechanism.

Figure 3:
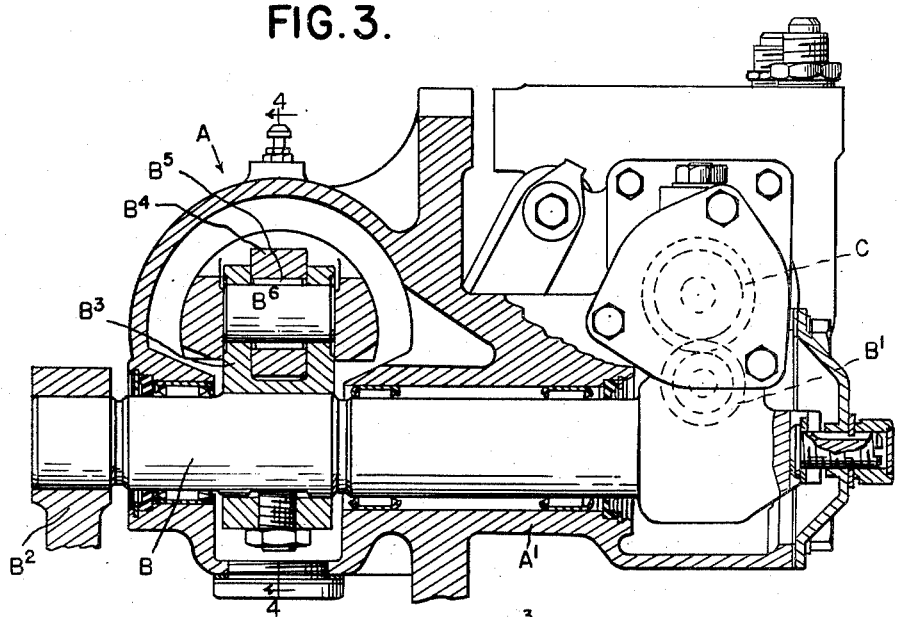
Fig. 3 is a section on line 3—3, Fig. 2.

My improved steering mechanism comprises essentially a unit including a hydraulic motor and valve mechanism, which unit, in the specific construction illustrated, is located at the base of the steering column of the motor vehicle and intermediate the same and the connections to the ground wheels. Also a hydraulic power circuit, which is actuated by the motor of the vehicle and supplies power to the hydraulic motor, which is controlled by the manually operable steering wheel.

Unit

The unit A includes a frame and housing member $A'$ connected to the vehicle frame and in which is journaled the horizontal rock shaft B having a worm gear member $B'$ at one end thereof, and a rock arm $B^2$ secured to the opposite end portion outside of the housing. The member $A'$ also includes a cylindrical portion $A^2$ having its axis transverse to the axis of the shaft B. Within this portion is a worm C of the hourglass type, which is in cooperative relation to the worm wheel $B'$ and is journaled in radial and end thrust roller bearings $C'$ and $C^2$ at opposite ends thereof. The worm and its bearings are insertable through one end of the cylindrical portion $A^2$, which end is then closed by a cap member $A^3$. The member $A'$ further includes a cylindrical portion $A^4$ at the opposite end of the member $A'$ from the cylindrical portion $A^2$ and having its axis parallel thereto. This portion $A^4$ has connected to opposite ends thereof cylinder members D and $D'$, which together therewith form the housing of a hydraulic motor to be later described. Connected to the frame and housing member $A'$ and at the opposite end of the portion $A^2$ from the cap $A^3$ is a housing member $A^5$ containing valves and other mechanism later described. This member $A^5$ has a cap $A^6$ bolted to the upper end thereof and provided with an upwardly extending hollow cylindrical portion $A^7$ forming a support for the tubular steering column of the vehicle.

Manually operable mechanism

The steering column E has therewithin the steering stem or shaft $E'$, which at its upper end has secured thereto a handwheel $E^2$ of any conventional type. The steering stem is not, however, directly attached to the worm as in conventional constructions, but has its axis spaced from the worm axis and connected thereto through mechanism of the following construction. Within the hollow portion $A^7$ is a shaft member F which has a spherical portion $F'$ engaging the inner surface of the member $A^7$ near the upper end thereof and forming a universal pivotal support for said shaft. The upper end of the shaft F is connected to the lower end of the stem $E'$ through a torque transmitting and sound deadening coupling $F^2$ which permits of a limited angular movement of the axis of the shaft with respect to that of the stem. As shown this coupling includes a tongue member $F^3$ attached to the stem and engaging furcations $F^4$ attached to the shaft and with a cushion $F^5$ of rubber or other resilient sound deadening material therebetween. The shaft F has at its lower end a gear wheel G which is in mesh with a gear wheel $G'$ mounted on the upper end of a shaft $G^2$ on which the worm C is mounted. Thus rotary movement of the handwheel $E^2$ may be transmitted through the stem $E'$, coupling $F^2$, shaft F, gear wheels G and $G'$ and shaft $G^2$ to the worm C for the manual operation of the steering mechanism should the power actuation fail. However, the reaction to torque transmission through the intermeshing gear wheels G and $G'$ will displace the shaft F to operate the power motor as later described.

Hydraulic motor

As previously described the portion $A^4$ of the casing member $A'$ together with the cylinder members D and $D'$ constitute the housing of a hydraulic motor. This motor includes piston heads H and $H'$, respectively, in the cylinders D and $D'$ and connected to each other by a bifurcated member $H^2$ extending through cylindrical portion $A^4$ of the casing $A'$. As shown, the heads H and $H'$ are attached by bolts $H^3$ to the opposite ends of the member $H^2$. Each head is also provided with a member $H^4$ extending axially thereof towards the other head and with the ends of these members spaced and parallel to each other. Secured to the shaft B in a plane intermediate the ends thereof is a rocker arm $B^3$ extending into the cylinder portion $A^4$ between the furcations of the member $H^2$. The outer end of this arm is bifurcated and has a roller $B^4$ between the furcations thereof preferably mounted by needle bearings $B^5$ on a stationary pin $B^6$. The diameter of the roller $B^4$ is the same as the spacing between the members $H^4$ of the piston heads so that any movement of said heads within their cylinders will through the members $H^4$ and roller $B^4$ rock the shaft B. The ends of the cylinders D and $D'$ are closed preferably by integral heads $D^2$, and between these heads and the piston heads H, $H'$ respectively are chambers $D^3$ and $D^4$ always filled with hydraulic fluid and connected with the hydraulic power circuit and its controlling mechanism as hereinafter described.

Hydraulic power circuit

The hydraulic fluid for operating the hydraulic motor is contained in a closed circuit I, which includes a reservoir $I'$, a rotary pump $I^2$ and return circuit connections including an outgoing conduit $I^3$ and a return conduit $I^4$. The pump $I^2$ may be driven by any suitable connection with the motor of the vehicle but, as specifically illustrated, is mounted on the same shaft as the electric generator J for the motor vehicle, which latter is operated through the belt $J'$ from the power shaft or other driven part of the vehicle motor. Included in the hydraulic circuit are chambers $D^3$ and $D^4$ of the hydraulic motor, but before further description of the circuit the valve mechanism for controlling the same will be described.

Valve construction

The valve mechanism for controlling the motor and hydraulic circuit includes at least one pair of piston valves located within the housing $A^5$ on opposite sides of the shaft F, each valve K being of the following construction. $a$ is a ported cylinder member and $b$ a ported piston member within said cylinder. The piston member $b$ is hollow and open at its outer end. It is further provided with a multiplicity of ports through the walls thereof which connect the interior chamber with annular grooves in its outer surface. The cylinder member is also provided with a plurality of annular grooves in its inner surface which are connected by ports with annular grooves in its outer surface, which latter cooperate with channels in the casing member $A^5$ in which member all of the valves are located. More in detail, the piston member $b$ has in its outer surface a plurality of narrow grooves $b'$, $b^2$ and also a groove $b^3$ spaced from each other by portions $b^4$ of the full diameter of the piston. All of these grooves are connected with the chamber $b^5$ in the interior through a multiplicity of ports $b^6$. The cylinder member $a$ has in its inner surface annular grooves $a'$ and $a^2$ for cooperation with the grooves $b'$ and $b^2$ of the piston member and annular grooves $a^3$ and $a^4$ for cooperation with the groove $b^3$ of said piston member. The grooves $a'$, $a^2$ and $a^3$ are connected by ports $a^5$ with a common annular groove $a^6$ in the outer surface of the cylinder and the groove $a^4$ is connected by ports $a^7$ with a groove $a^8$ also in the outer surface of the cylinder. Each of the valve assemblies is located in a cylindrical recess $A^8$ in the wall of the casing $A^5$ and is inserted therewithin through an open outer end. This outer end is then closed by a head member $c$, which may be either separate from or integral with the cylinder $a$, and is retained by a snap ring $d$ engaging a groove $e$. The cylinder member $a$ has at its outer end a flange $a^9$ engaging a shoulder in the recess $A^8$ against which it is pressed by the head $c$ to hold said cylinder in fixed position. A sealing ring $f$ (such as an O-ring) seals the head $c$ and sealing rings $f'$, $f^2$ in external grooves in the cylinder $a$ seal, respectively, between the grooves $a^6$ and $a^8$ and between the groove $a^6$ and the inner end of the recess $A^8$. These rings $f$, $f'$, $f^2$ are respectively on portions of the outer surface of the cylinder which progressively decreases in diameter and engage corresponding step portions of the recess $A^8$. A snap ring $b^7$ engaging a groove $b^8$ in the piston $b$ forms a stop for limiting the outward movement of the valve $b$, which is essential to the manual operation as later described.

Motor and power circuit control

Figure 7:
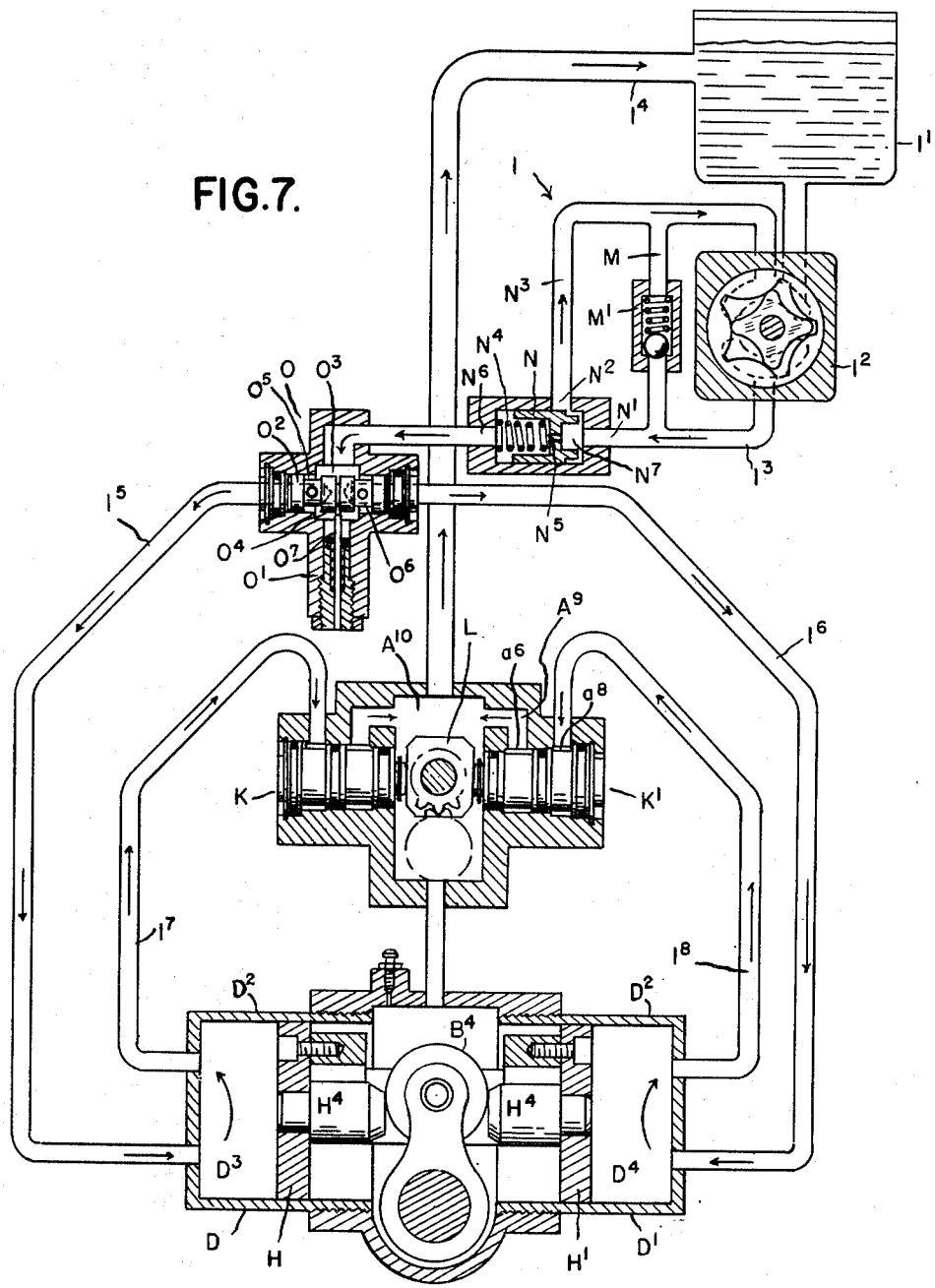
Fig. 7 is a diagram illustrating the power circuit, motor and controlling valves.

As previously described, the power circuit includes an outgoing conduit $I^3$ from the pump $I^2$ and a return conduit $I^4$ to the reservoir $I'$. The circuit portions intermediate these conduits are diagrammatically illustrated in Figs. 7 and 8, but in the actual construction they are formed within the unit A. In the diagrammatic illustration, the conduit $I^3$ has two branches $I^5$ and $I^6$ leading respectively to the chambers $D^3$ and $D^4$ of the hydraulic motor. These chambers have also connected thereto conduits $I^7$ and $I^8$, the one leading to the valve K and the other to the valve $K'$ which, as before stated, are on opposite sides of the shaft F within the casing $A^5$. The conduits $I^7$ and $I^8$ are connected with the grooves $a^8$ of the respective valves, while the grooves $a^6$ thereof lead through channels $A^9$ to a chamber $A^{10}$ in the interior of said casing, which is connected to the return conduit $I^4$. Swiveled upon the shaft F is a valve-operating member L, which is preferably a block arranged between the pistons $b$ of the valves K and $K'$. In the neutral position of the steering mechanism, the pistons $b$ are pressed against the member L by equal hydraulic pressures against the outer ends thereof that counterbalance each other. In this neutral position of each valve, the piston $b$ has the grooves $b'$, $b^2$ and $b^3$ thereof in partial registration with the cooperating grooves $a'$, $a^2$, $a^3$ and $a^4$ of the cylinder so that fluid flowing through the conduit $I^7$ or $I^8$ will pass into the central chamber $b^5$ of the piston and then outward through the grooves $b'$, $b^2$ and $a'$, $a^2$, $a^3$ into the channel $A^9$, chamber $A^{10}$ and return conduit $I^4$ to the reservoir $I'$. In other words there will be a continuous flow of fluid through the system including both branches $I^5$ and $I^6$ of the conduit $I^3$ through both chambers $D^3$ and $D^4$ of the motor, through both conduits $I^7$ and $I^8$, through the valves K and $K'$ and through the conduit $I^4$ back to the reservoir $I'$. Flow through the valves is somewhat restricted by the partial registration of the grooves of the piston with those of the cylinder and this restriction will build up pressures in the chambers $D^3$ and $D^4$ of the motor which counterbalance each other.

In the actual construction the conduits $I^3$ and $I^4$ are both formed of flexible hose, extending respectively from the pump and the reservoir to the unit A and being attached to the latter by suitable couplings. The branch circuits $I^5$ and $I^6$ are partly formed by passages within the housing member $A^5$ and partly by external conduits $D^5$ and $D^6$ extending from said housing $A^5$ respectively to the opposite ends of the cylinders D and $D'$.

Valve operating mechanism

As previously described, the steering mechanism can be manually operated without assistance from the power motor (in case of failure of power) starting with the handwheel $E^2$, through stem $E'$, coupling $F^2$, shaft F, gear wheels G and $G'$, shaft $G^2$ and worm C. Thus at any time should there be failure in the power actuation, the vehicle can be controlled manually. However, when the power system is operative, the reaction of torque transmission from the gear G to the intermeshing gear G' will produce a thrust against the shaft F which is transverse to its axis. Movement is permitted by the spherical bearing F' on the shaft and the resilient member F⁵ in the coupling F². Consequently, the gear wheel G is urged to travel in a planetary orbit about the gear wheel G', which movement is transmitted to the block member L forcing the piston b of one of the valves outward and permitting the piston of the other valve to travel inward. A roller L' bearing against an outer face of the member L will permit such lateral movement but will hold the gears G and G' in mesh with each other. The outward movement of the piston b in the one valve K will move the grooves b', b² and b³ further out of registration with the grooves a', a² and a³ thereby restricting communication between the conduit I⁸ and the chamber A¹⁰. This restricts the outlet from the chamber D⁴ whereupon hydraulic pressure will build up therewithin urging the motor piston to the left Fig. 7 and through the member H⁴, roller B⁴, rock arm B³, shaft B, rock arm B² and connecting rods (not shown) angularly adjusting the ground wheels of the vehicle. At the same time the follow up movement of the piston b of the valve K' will place the grooves of said piston and cylinder in full registration, thereby lessening restriction to flow of fluid out from the chamber D³ and through the conduit I⁴ to the reservoir I'. A further effect of this shifting of the valves is to build up pressure in the valve K opposing movement of its piston and to reduce pressure in the valve K' operating upon the piston thereof. Consequently, these unbalanced pressures will tend to return the valves to neutral positions and through the connecting mechanism will tend to return the handwheel to neutral. The force thus applied is only a fraction of the total force applied by the hydraulic motor to the movement of the ground wheels of the vehicle but is always proportional thereto. Consequently, this small fraction of the power is manually applied and the operator can feel the effort required to hold the valves in non-neutral position.

*Automatic valve control*

Further control of movement of fluid through the power circuit is accomplished by an automatic valve O located between the outlet conduit I³ of the pump and the branch conduits I⁵ and I⁶ leading to the hydraulic motor. The valve member O has a T-shaped casing O' with a piston valve O² within the cross portion of the T and extending upon opposite sides of a central chamber O³ within said casing. The opposite ends of the T are connected to the conduits I⁵ and I⁶. The piston has a central portion O⁴ less in length than the width of the chamber O³ with grooves O⁵ and O⁶ upon opposite sides of said portion. The piston is centralized by resilient means which, as shown, is a resilient arm O⁷ engaging a groove in the central portion O⁴. Thus when the pressures in the conduits I⁵ and I⁶ are unbalanced through the operation of the valves K and K', the piston O² of the valve O will be moved to cut off communication with the low pressure conduit and further open communication with the high pressure conduit which assists in the operation of the hydraulic motor.

*Modified construction of valve operating mechanism*

Figure 8:
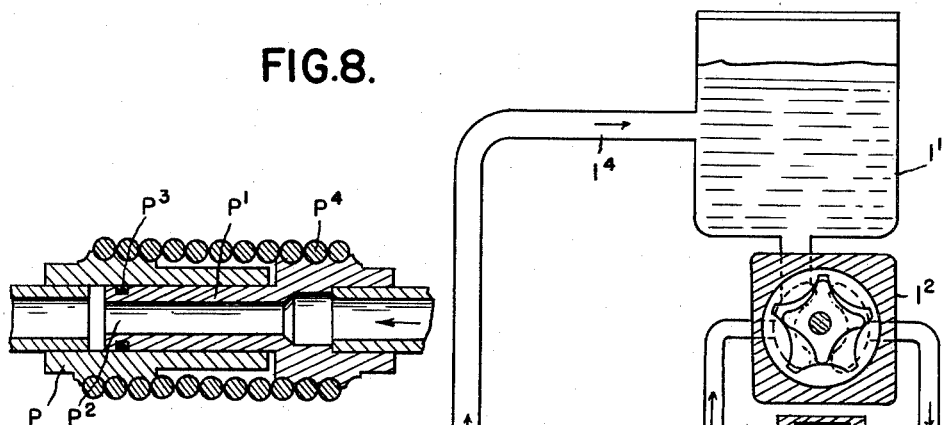
Fig. 8 is a similar diagram of a modified construction.

In place of the valve construction as thus far described, the automatic valve O may be dispensed with and a second pair of manually controlled piston valves substituted therefor for controlling the conduits I⁵ and I⁶. Such construction is illustrated in Fig. 8 in which K and K' are the valves of the pair previously described controlling the conduits I⁴ and I⁵ and K² and K³ the valves of the second pair which are located within the casing A⁵ in parallel relation to the first pair. Both pairs of valves are actuated by an operating block member L², which, like the operating member L previously described, is swiveled upon the shaft F but extends to be in contact with all of the pistons. When the shaft F is displaced by the torque reaction of the gears G and G', initial movement of the pistons of the valves K and K' will, as previously described, unbalance the pressures in the conduits I⁷ and I³. This will temporarily arrest further movement of said valves but will permit further movement of the member L² operating as a lever fulcruming upon the arrested piston and shifting the valves K² and K³. This will cut off communication between the conduit I³ and the inlet conduit I⁵ to the chamber D³ and will further open connection between the conduit I³ and the conduit I⁶ leading to the chamber D⁴. When the pistons of the valves K² and K³ have moved to the limit formed by stop ring b⁷, the piston K² becomes a fulcrum for the operator member L² so that further displacement of the shaft will further actuate the valves K and K'. In other words a similar function is performed to that in the construction previously described, but the valves K² and K³ are positively operated by the manual means and in advance of the full operation of the valves K and K'.

*Modified power circuit and valve control therefor*

A modified power circuit with controlling valves therefor is illustrated in Fig. 9 in which the fluid flowing through the chambers D³ and D⁴ is propelled by separate pumps and through separate circuits. Thus in place of the single pump I², two pumps Iᵃ and Iᵇ are mounted on the same shaft adjacent to each other, each having an inlet connection from the reservoir I'. The separate circuits Iᶜ and Iᵈ are similar to the branch circuits shown in Fig. 7 with the exception of their connection to separate pumps instead of to a common conduit from a single pump. The valves K and K' are similar to those in Fig. 7 and are operated in the same way. Each circuit has a bypass M with a pressure responsive valve M' therein and a second bypass N³ controlled by a velocity responsive valve N as later described.

*Other essential elements of the power circuit*

Inasmuch as the pump I² is driven by the motor of the vehicle, it is obvious that it will rotate at different speeds corresponding to the speed of movement of said motor and the vehicle. Such changing velocities in movement of the pump might result in corresponding changes in velocity of fluid flow through the power circuit, which is not desirable because of back pressure. It is customary in hydraulic fluid systems to provide a high pressure relief for the pump, such as a bypass M controlled by a spring load check valve M'. Such construction is governed by fluid pressures and does not control the velocity of movement of the fluid through the working circuit. I have therefore provided velocity controlling means of the following construction. N is a piston valve which has a fluid inlet passage N' directed against the end of the piston and a fluid outlet N² through the wall of the cylinder in which the piston travels, this outlet being connected to a second return fluid bypass N³. The piston N is biased to close the outlet N² by pressure of a spring N⁴ and said piston is also provided with a restricted port N⁵ through which fluid from the inlet can pass to an outlet N⁶ connected to the power circuit. It will be understood that increase in velocity of rotation of the pump will build up pressure in the outlet conduit I³ which acting upon the piston N will shift it to open the port connecting with the bypass N³. However, the restricted port N⁵ will check velocity of flow through the piston to the outlet N⁶ and will correspondingly govern the rate of flow of fluid through the power circuit.

*Pulse control*

Figure 10:
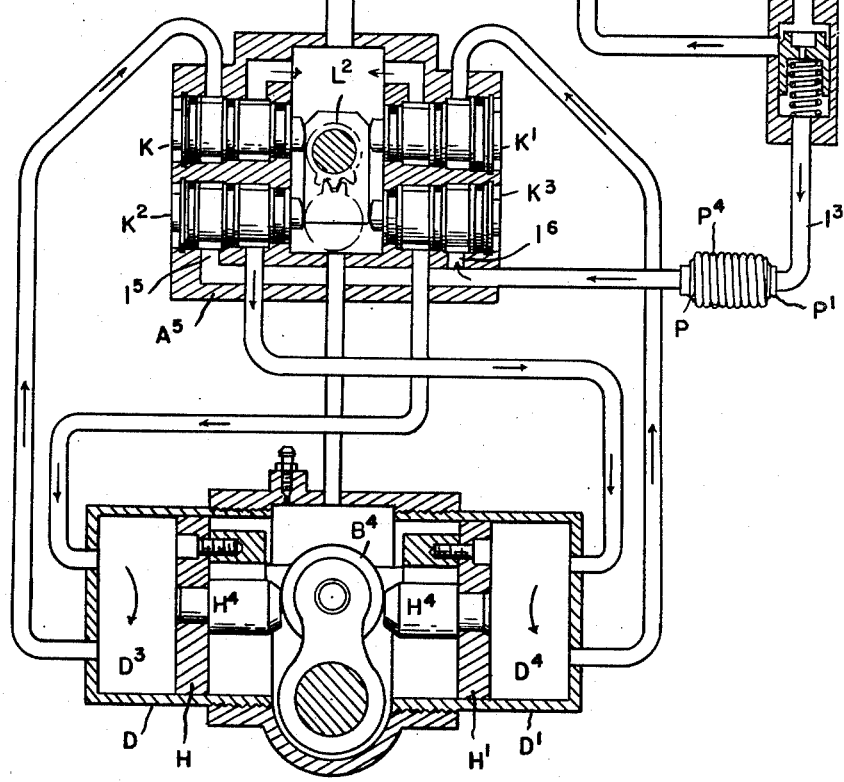
Fig. 10 is a longitudinal section through the pulse eliminating means.

In the operation of the pump, it is impossible to avoid pulsations in the outgoing fluid stream delivered by the impellers. As these pulsations create undesirable noise, controlling means is provided for eliminating the same in the motor and valve portions of the power circuit. Various specific devices may be used for this pulse control but essentially it includes an expansion chamber and a restriction in the conduit adjacent thereto. One construction, as illustrated in Fig. 10, comprises telescopically engaged members P and P′, the inner member P′ having a restricted axially extending passage $P^2$ therethrough and also having a sealing ring $P^3$ between the same and the inner face of the member P. A coil spring $P^4$ has its opposite ends threadedly engaged with said members P and P′ to extend therebetween and to resiliently resist axial movement of the one away from the other. Conduits of larger diameter than the restricted passage $P^2$ are connected to the opposite ends of the members P and P′ and are included in the conduit $I^3$. With this construction each pulse of the fluid from the pump will cause a relative movement of the members P and P′ which expands the space in advance of the restriction $P^2$ by the yielding of the spring $P^4$, which space is again contracted by the spring. This will iron out the pulse so that the fluid passing through the restricted passage $P^2$ and from there to the motor and valve portions of the circuit is substantially free from any pulsations.

A modified construction of pulse control may be formed by the use of a resiliently expansible hose connection between the pump and the restricted portion of the circuit.

*Noise eliminating means*

In the operation of any mechanism, noise vibrations are always developed to a greater or less extent. This is true of the valve mechanism within the housing $A^5$. As this housing is connected to the steering column and the mechanism therein is connected through the rotatable steering stem to the handwheel, there is danger of amplifying the noise to an objectionable extent through these parts. I have avoided this difficulty first by interposing sound insulation between the unit housing A and the steering column which is mounted thereon. This consists in a sleeve Q of rubber or similar material which surrounds the member $A^7$ and is between the same and the tube E. The sleeve Q is also provided with a flange Q′, which is between the lower end of the tube E and the cap $A^6$. Thus sound vibrations will not be readily transmitted from the casing A to the tube E. Also as previously described, the coupling $F^2$ between the shaft F and the steering stem E′ includes a cushion $F^5$ of rubber which has a sound deadening effect. Sound vibrations may also be developed by the operation of the piston valves K, K′, etc., from the floating valve operating member L. This is particularly true of any oscillations of the piston valve members imparted thereto from the member L and occasioned by road reactions transmitted through the steering mechanism. As previously described, these piston valve are subjected to hydraulic pressure against the outer ends thereof biasing them to move towards the member L. As hydraulic fluid is normally flowing through the valves, the fluid bearing against the outer end of each valve can be rapidly displaced when the piston is moved outward, which may result in the striking of the stop $b^7$ against the cylinder $a$ causing noise. Such result is avoided by placing a shock absorber between the chamber $b^5$ of each valve and the space at the outer end of the valve between the same and the head $c$. This shock absorber comprises a check valve R, which closes the outer end of the chamber $b^5$ and is between the same and a chamber $b^9$ at the outer end of the piston adjacent to the head $c$. The check valve has a small port R′ connecting the chambers $b^5$ and $b^9$ through which fluid can be discharged from the latter to the former when the piston is moving outward. The restriction of this port will, however, prevent any clattering movement of the piston. On the other hand, when the piston moves outward following the movement of the member L, the check valve will open to provide free communication between the chambers $b^5$ and $b^9$.

Figure 6:
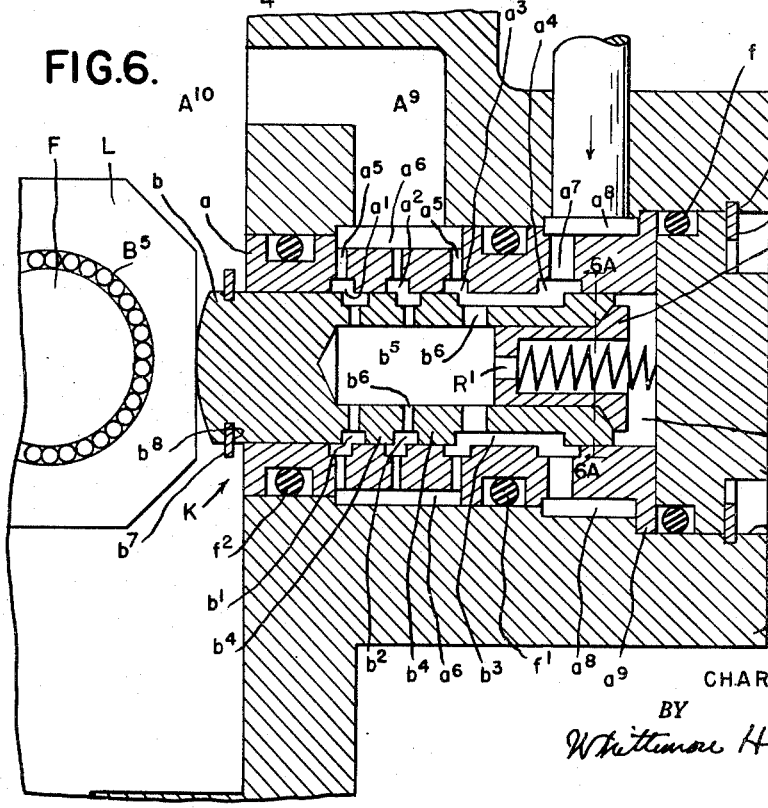
Fig. 6 is an enlarged section through one of the valves.
Figure 6A:
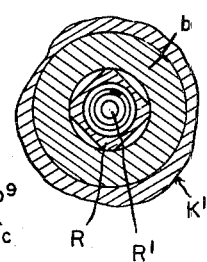
Fig. 6A is a section on line 6A—6A, Fig. 6.

A somewhat modified form of valve is illustrated in Fig. 6B, in which a ball check valve $R^2$ normally closes a port $R^3$ in the check valve R, and the restricted passage connecting the chambers $b^5$ and $b^9$ is formed by a port $R^4$ in the valve R communicating with clearance space about said valve. Further communication between the chambers $b^5$ and $b^9$ is provided by a groove $b^{10}$ and channel $b^{11}$ externally of the piston $b$, which groove in the neutral position of the piston is in communication with the groove $a^4$ in the cylinder $a$. A light spring $R^5$ presses the check valve $R^2$ to its seat and a heavier spring $R^6$ seats the check valve R. With this construction, there will be free communication between the chambers $b^5$ and $b^9$ during the initial outward movement of the piston $b$ through the grooves $a^4$, $b^{10}$ and channel $b^{11}$. However, before the piston moves far enough to strike the stop $b^7$ against the cylinder $a$, the groove $b^{10}$ passes out of registration with the groove $a^4$ so that further displacement of fluid from the chamber $b^9$ to the chamber $b^5$ can only occur through the restricted port $R^4$. This checks velocity of the piston and avoids noise producing striking of the stop $b^7$ against the cylinder $a$. On the other hand return movement of the piston $b$ will unseat the check valve $R^2$ and provide for quick transfer of fluid from the chamber $b^5$ to the chamber $b^9$. Movements of the valves which might generate noise are not due so much to the manual operation thereof as from road reactions on the ground wheels of the steering mechanism. The latter would impart greater velocity of movement to the member L and through it to the valves. However, with the construction above described, velocity of movement of the valves is checked and noise is avoided.

A further cause of noise is too great a restriction at any point for the flow of hydraulic fluid. This might occur in the ports of the valves but is avoided in the construction shown by the multiplicity of grooves $b$, $b'$, etc., and $a$, $a'$, etc. As these grooves are simultaneously restricted in the movement of the valve, their combined areas in registration will be in excess of that possible with the single pair of grooves, unless the diameter of the piston is increased. Thus hissing or fluid noise may be avoided without the necessity of enlarging the valves. Noise is therefore avoided either from too great restriction of fluid passages or impact of mechanical elements.

*Operation*

The operation of the manual and power actuated steering mechanism will be understood from the above, but briefly described is as follows. Whenever the vehicle motor is in operation it will, through the connections described, operate the pump or pumps causing a constant flow of hydraulic fluid through the system. If the handwheel $E^2$ is in neutral position, the valves will also be in neutral position and will permit continuous flow of fluid through both branches of the circuit and through the chambers $D^3$ and $D^4$ of the motor. However, there is sufficient restriction to flow of fluid through the valves to develop hydraulic pressures in the chambers $D^3$ and $D^4$, which are equal, counterbalancing each other. If the handwheel $E^2$ is turned in either direction from its neutral position, this will transmit rotary movement through the shafts E′ and F and gear wheels G and G′ to the worm C. However, the torque reaction in the gears G and G′ will rock the shaft F and, through the block member L, will operate the valves as previously described. The initial movement of the valves will unbalance the hydraulic pressures in the chambers $D^3$ and $D^4$ causing substantially instantaneous response of the motor. The only opposition to the manual operation is the hydraulic pressure on the displaced valves tending to return them to neutral. Frictional resistance is negligible and therefore the manual effort required for turning the handwheel $E^2$ is in exact proportion to the total force operating the steering mechanism and may be any desired fraction thereof.

What I claim as my invention is:

1. In a steering mechanism for road motor vehicles capable of traveling at high speed and including manually operable means for actuation thereof and cooperating power actuating means for normally carrying a proportionate and the greater part of the steering load; a hydraulic cylinder and piston motor for said power actuating means having at opposite ends of the cylinder fluid pressure chambers for actuating said piston in opposite directions, a hydraulic power circuit having a circuit portion including a pump actuated by the vehicle motor in constant ratio to the velocity thereof, a branch circuit portion including means for maintaining therein a substantially constant velocity of flow regardless of the varying velocity and displacement of said pump, sub-branches of said branch circuit having intermediate connections respectively to said fluid pressure chambers and each including portions leading to and from the same, a torque transmission in said manually operable means including a pair of rotary members with eccentric axes, the one having freedom for limited floating planetary movement with respect to the other and during initial movement of said manually operable means in either of reverse directions being displaced in a corresponding direction by the torque reaction between said rotary members, piston valves controlling said sub-branches located on opposite sides of said floating member to be actuated by movements thereof respectively in reverse directions, said valves in neutral positions permitting continuous but restricted flow of fluid through both sub-branches and when displaced from neutral by said floating member further restricting the outlet portion of the corresponding sub-branch to increase the pressure in said sub-branch and energize the hydraulic motor, and hydraulic means responding to the fluid pressure of the energized motor for reversely actuating said valves opposing manual displacement thereof with a force proportionate to the total steering load and which reacts against the manually operable means to impose thereon the said proportionate load.

2. The construction as in claim 1 in which said portions of the sub-branches leading to and from the pressure chambers have spaced connections thereto causing flow of fluid through said chambers.

3. The construction as in claim 1 in which said valves while restricting the outlet portion of the sub-branches for one of said chambers simultaneously closes the inlet portion of the sub-branch for the other chamber.

4. The construction as in claim 1 in which the valves comprise two parallelly arranged adjacent pairs of aligned and opposed spaced piston valves, the valves of one pair controlling the inlets and those of the other pair the outlets of the respective chambers, and a valve operating member swiveled on said floating rotary member to be actuated thereby and extending between and in contact with the pistons of both pairs of valves.

5. The construction as in claim 4 in which the piston of each of said valves is hydraulically pressed against said valve operating member, the pressures on opposite sides of the latter being in balance only in the neutral position of said valves, and the swivel mounting of said valve operating member on said floating rotary member being located between said pairs of valves whereby said valve operating member becomes a lever of the third class alternatively fulcrumed on the pistons of said pairs of valves, said lever initially actuating the pistons of the outlet controlling valves whereupon the unbalancing of the hydraulic pressures thereof temporarily arrests further movement forming a fulcrum for operating to the limit said inlet controlling valves which then form a fulcrum for said lever completing the operation of the outlet valves.

6. The construction as in claim 1 in which the means for maintaining substantially constant velocity of flow in said branch circuit comprises a cylinder having one end thereof connected to the delivery from the pump, the opposite end connected to said branch circuit, and a port intermediate its ends connected to a return to the pump, a piston in said cylinder, a restricted passage between the portions of said cylinder at opposite ends of said piston and resilient means biasing said piston to move counter to direct pump pressure to close said port.

7. The construction as in claim 1 including a completely liquid filled resilient expansion chamber in a portion of the hydraulic circuit between the pump and said branch circuit and with a restricted passage between said expansion chamber and branch, the resiliency of said expansion chamber being proportioned to the pressure pulsations of said pump and the size of said restricted passage, to substantially neutralize pulsations in said branch circuit.

8. The construction as in claim 1 in which each piston valve has a hydraulic dashpot for retarding its movement under actuation of said floating member.

9. The construction as in claim 8 in which the valve cylinder has at one end a pocket into which said piston is moved by displacement of said floating member with a restricted port for escape of fluid from said pocket, and a one-way valve for opening a larger port to said pocket when said piston is moved in the opposite direction.

10. In a motor-propelled vehicle having a propulsion motor, a fluid pressure system comprising a positive displacement pump part driven at a speed proportionate to the speed of the propulsion motor and having a fluid supply, power steering mechanism including a fluid motor having a valving part associated therewith for accommodating a continuous flow of motive fluid and utilizing a predetermined minimum flow therefrom for the effective operation of the said mechanism, said valving part having neutral and motor-motivating positions for causing the fluid motor to set the power steering in motion and at rest selectively while accommodating the above described continuous flow of motive fluid, fluid flow means for so connecting said parts as to deliver substantially only said predetermined minimum flow to the valving part and motor from the pump, said fluid flow means comprising flow communication between said parts, a calibrated orifice interposed in said communication, first means presenting a movable valving surface having a closed position, a bypass leading from the communication adjacent the orifice and being closed by said valving surface of said first means when the latter is in said closed position, said valving surface being movable into a position effecting the opening of said bypass, and second means associated with the first means comprising an opposed pair of actuating portions responsive one to fluid pressure upstream of said orifice and the other to fluid pressure downstream of said orifice and arranged for effecting movement of the valving surface and opening of the bypass incident to a pressure drop across the calibrated orifice indicative of attainment of said predetermined minimum flow through the communication to the valving part and accommodated by the communication when the said valving part is in any one of the neutral and motor motivating positions aforesaid.

11. In a motor-propelled vehicle having a propulsion motor, a fluid pressure system comprising a positive displacement pump part driven at a speed proportionate to the speed of the propulsion motor and having a fluid supply, power steering mechanism including a fluid motor having a valving part associated therewith for accommodating a continuous flow of motive fluid and utilizing a predetermined minimum flow therefrom for the effective operation of the said mechanism, said valving part having neutral and motor-motivating positions for causing the fluid motor to set the power steering in motion and at rest selectively while accommodating the above described continuous flow of motive fluid, fluid flow means for so connecting said parts as to deliver substantially only said predetermined minimum flow to the valving part and motor from the pump, said fluid flow means comprising flow communication between said parts, a calibrated orifice interposed in said communication, first means presenting a movable valving surface having a closed position, a bypass leading from the communication adjacent the orifice and being closed by said valving surface of said first means when the latter is in said closed position, said valving surface being movable into a position effecting the opening of said bypass, and second means associated with the first means comprising an opposed pair of actuating portions responsive one to fluid pressure upstream of said orifice and the other to fluid pressure downstream of said orifice and arranged for effecting movement of the valving surface and opening of the bypass incident to a pressure drop across the calibrated orifice indicative of attainment of said predetermined minimum flow through the communication to the valving part and accommodated by the communication when the said valving part is in any one of the neutral and motor-motivating positions aforesaid, said first and second means being movable together in paths conforming to a common axis of motion and having associated therewith resilient means continually tending to produce the bias for urging the valving surface into closed position.

12. Fluid pressure system for a steerable automotive vehicle comprising a normally unactuated fluid pressure operated steering mechanism adapted to be actuated to move loads offering varying resistance, said steering mechanism having means on the intake side thereof forming a path for pressure fluid and having control valving therefor in said path continuously permitting said fluid to flow therethrough throughout the range of failing to apply any substantial pressure to leave the mechanism at rest and causing pressure to be applied to set the mechanism in motion both when relatively loaded and when relatively unloaded, said steering mechanism being arranged for performing desirably under conditions of predetermined pressure and rate of flow in the pressure fluid path, means adapted to deliver a supply of fluid under varying pressure communicating with said fluid path, bypasses providing for return of fluid from said fluid path back to the source of fluid supply, restrictive valving adjustable with respect to the bypasses having means sensitive to characteristics of the fluid associated therewith for opening a said bypass under highly resistive loadings on the steering mechanism creating back pressures in the fluid path arising to said predetermined pressure and for independently opening another said bypass in accordance only with rates of flow in said fluid path above said predetermined rate without regard to the degree of actuation of said steering mechanism through the pressure range aforesaid.

13. In an engine-propelled vehicle having a manually controlled steering gear and a steerable road wheel, a pump-driven hydraulic steering mechanism of the open valve type for turning said steerable road wheel in response to actuation of said manually controlled steering gear and otherwise permitting said driving pump to operate against substantially no resistance, said mechanism comprising means for mechanically connecting the driving pump to the vehicle engine to provide a direct mechanical drive therebetween whereby the pump is always driven at a speed proportional to the speed of the engine, a valving-controlled steering motor driven by the pump, said valving being controlled in response to the above-described steering gear actuation and having a neutral open-valve position permitting free circulation of the pump output against no substantial opposing pressure, said pump being a positive displacement pump having a fluid flow supply path and a fluid flow discharge path for carrying the effective output thereof and communicating with the valving-controlled steering motor, bypass between the respective flow paths of the pump for accommodating excessive flow from the pump above a predetermined rate of effective output to the steering motor, and flow control means forming an adjustable restriction with respect to the bypass, said flow control means including fixed and movable parts one of which is formed to provide a pre-calibrated orifice in the pump effective output flow path, said fixed and movable parts establishing cooperation with one another to open the bypass restriction adjustably in accordance with the magnitude of pressure differential across said pre-calibrated orifice for limiting the effective output flow available to the open-valve type controlled steering motor to said predetermined rate throughout the operating range of the steering motor including the open-valve substantially unopposed condition thereof and throughout the speed range of the pump and vehicle engine.

14. In an engine-propelled vehicle having a manually controlled steering gear and a steerable road wheel, a pump-driven hydraulic steering mechanism of the open valve type for turning said steerable road wheel in response to actuation of said manually controlled steering gear and otherwise permitting said driving pump to operate against substantially no resistance, said mechanism comprising means for mechanically connecting the driving pump to the vehicle engine to provide a direct mechanical drive therebetween whereby the pump is always driven at a speed proportional to the speed of the engine, a valving-controlled steering motor driven by the pump, said valving being controlled in response to the above described steering gear actuation and having a neutral open-valve position permitting free circulation of the pump output against no substantial opposing pressure, said pump being a positive displacement pump having a fluid flow supply path and a fluid flow discharge path for carrying the effective output thereof and communicating with the valving-controlled steering motor, bypass between the respective flow paths of the pump for accommodating excessive flow from the pump above a predetermined rate of effective output to the steering motor, flow control means forming an adjustable restriction with respect to the bypass, said flow control means including fixed and movable parts one of which is formed to provide a pre-calibrated orifice in the pump effective output flow path, said fixed and movable parts establishing cooperation with one another to open the bypass restriction adjustably in accordance with the magnitude of pressure differential across said pre-calibrated orifice for limiting the effective output flow available to the open-valve type controlled steering motor to said predetermined rate throughout the operating range of the steering motor including the open-valve substantially unopposed condition thereof and throughout the speed range of the pump and vehicle engine, and a relief communication between said respective flow paths of the pump operated independently of said bypass for preventing excessive output flow pressures.

References Cited in the file of this patent

UNITED STATES PATENTS

| Number | Name | Date |
| --- | --- | --- |
| 1,150,800 | Aldrich | Aug. 17, 1915 |
| 1,467,522 | Amsler | Sept. 11, 1923 |
| 1,875,226 | Dewandre | Aug. 30, 1932 |
| 1,890,041 | McLeod | Dec. 6, 1932 |
| 1,894,020 | Chance | Jan. 10, 1933 |
| 1,952,806 | Hyland | Mar. 27, 1934 |
| 2,108,498 | McLeod | Feb. 15, 1938 |
| 2,382,866 | Edge et al. | Aug. 14, 1945 |
| 2,516,508 | Donner | July 25, 1950 |
| 2,526,709 | Tait | Oct. 24, 1950 |
| 2,554,843 | Staude | May 29, 1951 |
| 2,574,751 | Noll | Nov. 13, 1951 |
| 2,603,065 | Sarto | July 15, 1952 |

FOREIGN PATENTS

| Number | Country | Date |
| --- | --- | --- |
| 668,388 | France | July 9, 1929 |